Figure 1:
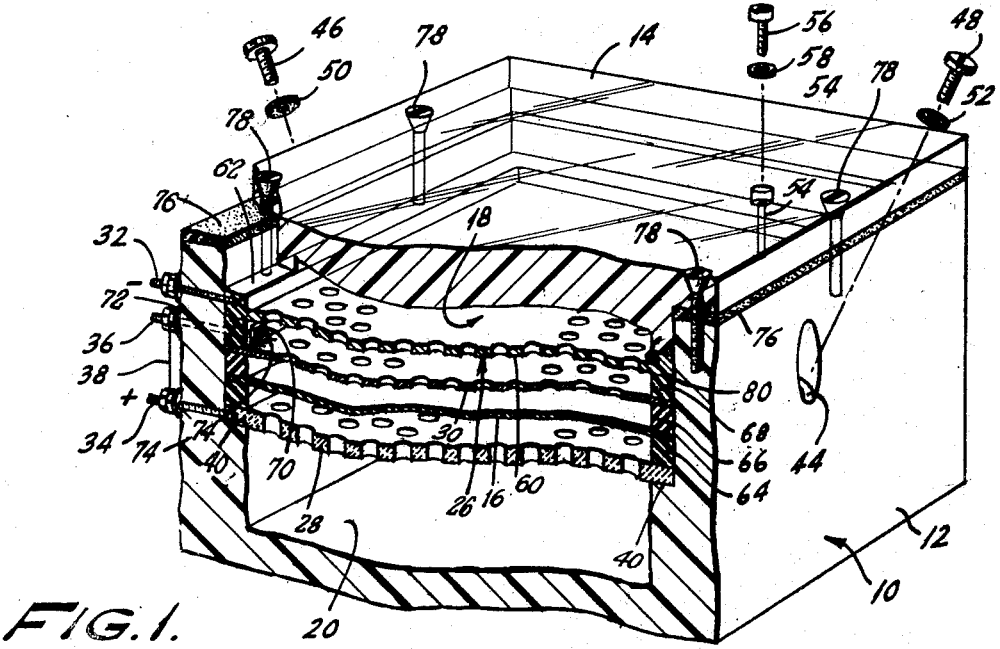

Dec. 3, 1963  M. E. LASSER ETAL  3,113,047
RADIANT ENERGY CHARGEABLE ELECTRIC CELL
Filed April 27, 1959  2 Sheets-Sheet 1

INVENTORS
MARVIN E. LASSER
SOLOMON ZAROMB
BY
Herbert Epstein
AGENT

INVENTORS
MARVIN E. LASSER
SOLOMON ZAROMB
BY Herbert Epstein
AGENT

United States Patent Office 3,113,047
Patented Dec. 3, 1963

3,113,047
RADIANT ENERGY CHARGEABLE
ELECTRIC CELL
Marvin E. Lasser, Elkins Park, and Solomon Zaromb,
Philadelphia County, Pa., assignors, by mesne assign-
ments, to Philco Corporation, Philadelphia, Pa., a cor-
poration of Delaware
Filed Apr. 27, 1959, Ser. No. 809,219
12 Claims. (Cl. 136—6)

This invention relates to electric cells for the produc-
tion of electrical energy by chemical action. More par-
ticularly it relates to means for rendering such cells again
effective to generate electrical energy after they have been
rendered ineffective in the course of operation in supply-
ing electrical energy to external loads. It also relates
to means for inhibiting within such cells reactions tend-
ing to render such cells ineffective even though no elec-
trical energy has been withdrawn therefrom.

Electric cells are known which comprise a pair of dis-
similar electrodes disposed in a suitable electrolyte sys-
tem, in which, by chemical interaction between the elec-
trolyte system and the electrodes, electrical energy is
generated and an electric current caused to flow through
an external circuit connected between the electrodes.
In the operation of such cells, as the chemical reaction
between the electrolyte system and the electrodes pro-
ceeds, the surface portion of at least one of the elec-
trodes is converted into a substance different from the
material of which the electrode was originally composed.
When a substantial portion of the surface of the electrode
has thus been converted, the chemical action of the elec-
trolyte system on that electrode is inhibited and the cell
is thereby rendered ineffective as a generator of electrical
energy—i.e. it becomes discharged. Also it is known
that such cells may be recharged or restored substantially
to their original conditions, so as again to be capable of
generating electrical energy, by applying between their
electrodes a voltage poled the same as the voltage pro-
duced by the cell and of magnitude sufficient to cause a
current to flow between the electrodes and through the
electrolyte system in a direction opposite that in which
current flows when the cell is supplying electrical energy
to an external load. The result of this is to convert the
substance formed on the surface of said one electrode
during the operation of the cell as a generator of elec-
trical energy to the material of which said electrode was
originally formed, thus restoring said electrode substan-
tially to its original composition. Prior to the present
invention this was the only means known for restoring
such a cell to its original condition and rendering it again
capable of generating and supplying energy to an external
load.

We have discovered that this is not the only way in
which a cell of this sort can be recharged after having
discharged. On the contrary, as had not been heretofore
been recognized, certain ones of these cells can be re-
stored to their original conditions and again rendered
operative as generators of electrical energy by the appli-
cation of radiant energy to the components of the cell
and particularly to the electrode whose surface portion
has been converted by chemical reaction during the
operation of the cell as a source of electrical energy.
Apparently the effect of the radiant energy upon the cell
is such as to cause an interaction between the electrolyte
system and the electrode whose surface portion has be-
come converted, so as to reconvert the surface portion
of said electrode to the material of which said electrode
was originally composed, just as if a recharging voltage
had been applied between the electrodes.

However in some cells which would otherwise be re-
chargeable by radiant energy, an agent present in the
electrolyte system and necessary to the operation of the
cell reacts chemically with the material of which the
radiant-energy responsive electrode is composed, thereby
converting this material into the substance normally pro-
duced upon withdrawal of electrical energy from the cell.
However no electrical energy is produced by this reac-
tion. Moreover when the cell is being recharged this
parasitic reaction diminishes the net rate of recharging.
Although this diminution may be unimportant where
electrical recharging is employed inasmuch as it can be
overcome by increasing the intensity of the charging cur-
rent, it becomes very important where radiant energy of
relatively low power level is employed to recharge the
cell. In such cases the parasitic chemical reaction may
be producing said substance at practically the same rate
as that at which the incident radiant energy is converting
said substance into the material of which the radiant-
energy responsive electrode was originally composed.
As a result the net recharging rate of the cell may be
impractically low. Thus to render such cells recharge-
able at a useful rate by radiant energy, it is necessary
to inhibit this undesired reaction without however dele-
teriously affecting the operation of the cell.

Accordingly it is an object of our invention to provide
an electric cell which generates electrical energy by
chemical action, whose effectiveness as a generator of
electrical energy tends to become impaired in the course
of its operation, and which is responsive to radiant energy
to have its effectiveness enhanced or restored.

Another object is to provide a cell which is responsive
to radiant energy from a source external to the cell, such
as sunlight, to enhance or restore its effectiveness.

Another object is to provide such a cell including
within it a source of radiant energy such as that resulting
from the disintegration of atomic nuclei, which energy
is effective to enhance or restore the effectiveness of the
cell as a source of electrical energy as its effectiveness
tends to become impaired in the course of operation.

Another object is to provide a cell which is capable
of being recharged by radiant energy at a useful rate and
also is capable of storing electrical energy for a substan-
tial length of time.

Another object is to provide a cell in which parasitic
reactions tending to reduce the energy-storage capacity of
the cell are inhibited.

To achieve the foregoing objects we have provided, in
accordance with our invention, an electric cell compris-
ing an electrolyte system and a pair of electrodes im-
mersed therein which is capable of producing electrical
energy through interaction of the electrolyte system and
the electrodes. This cell is characterized in that upon
removal of electrical energy therefrom the material form-
ing a surface portion of one of its electrodes is converted
into a substance which tends to impair the ability of the
cell to produce electrical energy and which is responsive
to radiant energy incident thereon both to re-form
said material and produce an agent tending to react with
said material to re-form said substance without however
producing electrical energy. To permit recharging of the
cell by radiant energy the electrodes and electrolyte sys-
tem thereof are arranged to admit radiant energy to said
one electrode, and to make feasible recharging by radiant
energy at a useful rate as well as the storage of this
charge for a substantial length of time, means are pro-
vided for maintaining the concentration of said agent at
a low value adjacent said one electrode. Two forms of
these means are described more fully hereinafter.

Because the desired reconversion of the surface por-
tion of an electrode in a cell of the sort contemplated by
this invention can be effected in response to various
forms of radiant energy, including visible light and other
forms of electromagnetic radiation as well as corpuscular emissions resulting from the disintegration of atomic nuclei, our invention may be embodied in various different forms. In one typical form the electrolyte system and the electrodes may be disposed in a suitable container at least certain portions of which are transmissive of radiant energy originating outside the container so as to permit such radiant energy to enter the cell and impinge upon the electrode upon which said substance is formed. Thus the container may comprise portions transmissive of sunlight so that the cell may be capable of being restored to its condition as a source of electrical energy in response to solar radiation. Further, in a cell of the sort just discussed, the electrode to be impinged by the radiant energy may be so formed as to permit the maximum amount of radiation to impinge thereon, and if desired there may be included in the container suitable reflectors and/or other optical means for concentrating on the electrode the maximum amount of radiant energy from outside the cell.

In another form of the invention the container need not be transmissive of radiant energy. Instead there may be included in the container a source of radiation which is continually effective to supply radiant energy to the electrode to restore it to its charged condition even while electrical energy is being supplied to an external load by the cell.

Figure 2:
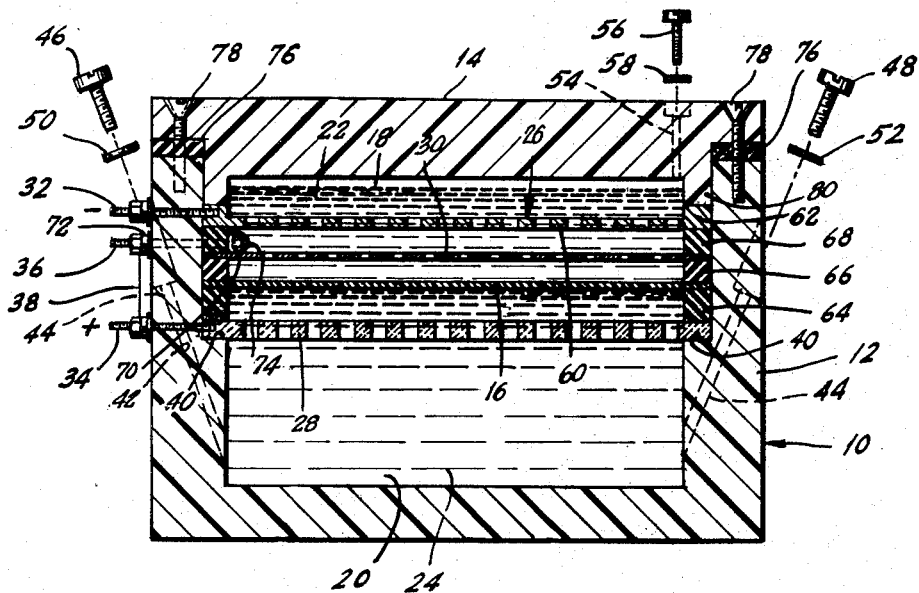
Figure 3:
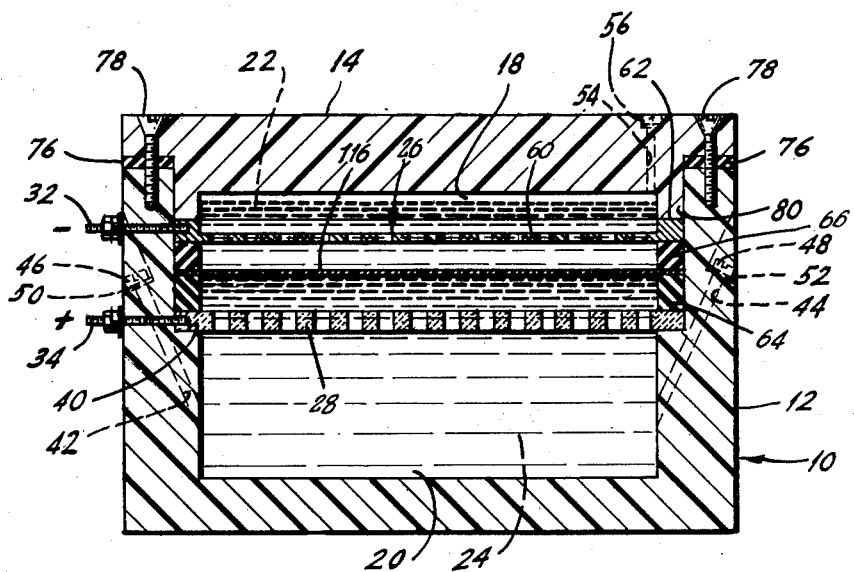
Figure 4:
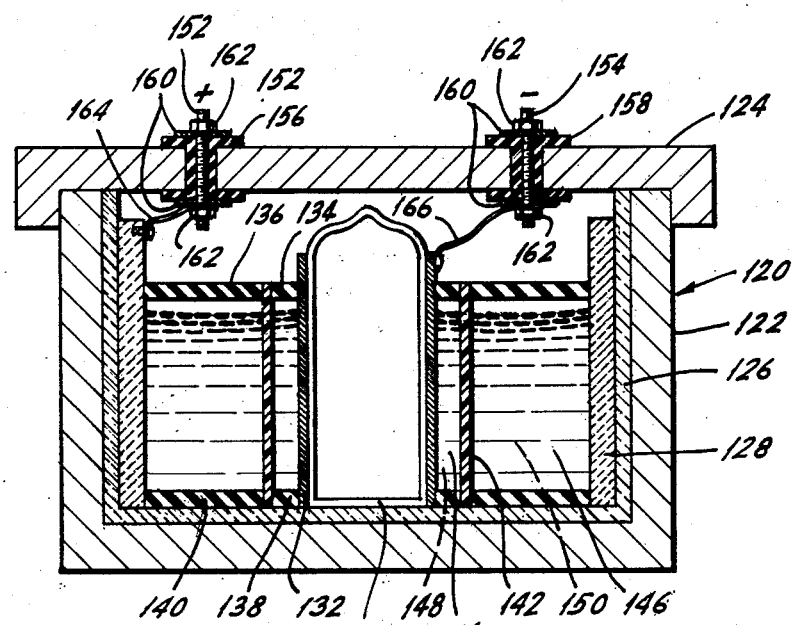

The invention will be understood more fully from a consideration of the following description taken in connection with the accompanying drawings in which FIGURES 1 and 2 illustrate in perspective and cross-sectional views one cell according to the invention, and FIGURES 3 and 4 respectively illustrate in cross-sectional views two other cells according to the invention.

Referring to FIGURES 1 and 2, the novel cell there illustrated comprises a container 10 including a receptacle 12 and a lid 14 each composed of an insulating material. In accordance with the invention lid 14 is transmissive of visible light and preferably also of ultra-violet light. Separating means 16 divide the interior of receptacle 12 into two non-communicating compartments 18 and 20 respectively. Upper compartment 18 is partially filled with a first electrolyte 22 while lower compartment 20 is entirely filled with a second electrolyte 24. A first electrode 26 is immersed in electrolyte 22. This electrode is composed of a material which, upon removal of electrical energy from the cell, is converted by interaction with electrolyte 22 into a substance which tends to impair the ability of the cell to produce electrical energy and which is responsive to radiant energy incident thereon to re-form said material. Moreover electrode 26 is positioned adjacent translucent lid 14 so as to be impinged by light, e.g. sunlight, incident on lid 14. A second electrode 28 is positioned in electrolyte 24 and a third electrode 30 is positioned in electrolyte 22 between electrode 26 and separating means 16. Screw terminals 32, 34 and 36 afford electrical connection to electrodes 26, 28 and 30 respectively.

Electrolytes 22 and 24 each comprise an agent which is important to the operation of the cell but which when contacted in any substantial concentration with the material of which the first electrode is composed reacts chemically therewith to produce the aforementioned substance normally produced upon electrical discharge of the cell without however producing any electrical energy. More specifically such an agent may comprise as its active element a specific ion of given polarity which participates in the production of electrical energy by undergoing a change in valence. The ion, with its valence so changed, has substantially no tendency to react with first electrode 26. Because the ampere-hour capacity of the cell in practice may be limited by the total mass of this agent present in the cell, it is desirable that the cell contain a relatively large mass of this agent. To achieve this end without making the cell unduly large it is necessary that the electrolyte system contain a relatively high concentration of this agent. However if the agent in such high concentration be permitted to contact first electrode 26 it will rapidly corrode the electrode.

In accordance with the invention, means are provided for maintaining at a low value the concentration of said agent adjacent first electrode 26 while permitting the electrolyte system as a whole to contain a relatively high concentration of the agent. This means comprises separating means 16, which in the embodiment illustrated in FIGURES 1 and 2 is constructed of a material substantially impermeable to ions having said given polarity of the ion forming the active element of the agent, while being highly permeable to ions of the opposite polarity. Under these conditions it is feasible to surround first electrode 26 with a relatively small volume of electrolyte containing a very low concentration of said agent while surrounding second electrode 28 with a relatively large volume of electrolyte containing a relatively high concentration of said agent. Preferably electrode 28 is composed of a substance chemically inert in electrolyte 24. Accordingly a cell is provided having a relatively high ampere-hour capacity and in which first electrode 26 is effectively protected from corrosion by said agent.

Where a membrane is used which is impermeable to the active ion of the agent it is necessary to provide an external path for electrons in order that the cell may be fully recharged radiatively even though no external circuit is connected between output terminals 32 and 34. This path may be provided by low-impedance means, e.g. a conductor 38, connected between terminals 34 and 36 and permitting a flow of electrons between second and third electrodes 28 and 30. The operation of this electrode system is set forth in more detail in the following description of a specific, preferred embodiment of the cell of FIGURES 1 and 2.

In a specific embodiment receptacle 12 and lid 14 are composed of an electrically insulating, translucent plastic such as polystyrene. Receptacle 12 comprises an interior shelf 40 upon which electrodes 26, 28 and 30 and spacing means 16 are supported. In addition it comprises ducts 42 and 44 through which electrolyte 24 is added to lower compartment 20 of the cell after partial assembly thereof. Ducts 42 and 44 are closable by means of screws 46 and 48 and compressible washers 50 and 52, composed of substances chemically inert in electrolyte 24. Lid 14 comprises an air vent 54 closable by a screw 56 and compressible washer 58 both chemically inert in electrolyte 22.

First electrode 26 comprises a sheet 60 of silver supported by a silver rim 62 integral with sheet 60. Sheet 60 is perforated to permit electrolyte to pass therethrough and is preferably coated prior to assembly of the cell with an extremely thin layer (e.g. 5 to 20 microns thick) of substantially non-porous silver chloride. This layer may be applied in the following manner:

Electrode 26 first is cleansed chemically, e.g. by immersing it for 15 to 20 seconds into a solution consisting essentially of 1 volume of concentrated nitric acid to 1 volume of water. Next electrode 26 and its cleansing solution are dumped into a large excess of distilled water. Thereafter electrode 26 is rinsed in acetone and permitted to dry in the air. After this cleansing, electrode 26 is immersed for about 20 seconds in a bath of molten silver chloride having a temperature between about 500 and 600° C. Thereafter the electrode is withdrawn from the bath but is maintained at a temperature above the melting point of silver chloride (455° C.) in contact with the crucible containing the bath, in order to drain excess silver chloride from the electrode. This draining typically takes 30 seconds. The electrode is then permitted to cool to room temperature. The foregoing treatment provides electrode 26 with a substantially non-porous coating of silver chloride typically between about 5 and 20 microns thick. Such a layer has been found to make more uniform the light-recharging properties of the cell.

Electrolytes 22 and 24 each initially consist essentially of an aqueous solution of ferric chloride and hydrochloric acid. Because ferric chloride is an agent which when contacted in substantial concentration with silver vigorously reacts therewith to form silver chloride and ferrous chloride without however producing electrical energy, the concentration of ferric chloride in electrolyte 22 contacting silver electrode 26 preferably is very low and the volume of electrolyte 22 small. By contrast because ferric chloride is one of the cell constituents producing and storing electrical energy, its concentration in electrolyte 24 is preferably relatively high and the volume of electrolyte 24 large. In a specific instance the respective initial concentrations of hydrochloric acid and ferric chloride in electrolyte 22 are about 0.1 molar and between about 0.0001 and 0.001 molar, while the respective initial concentrations of hydrochloric acid and ferric chloride in electrolyte 24 are about 0.04 molar and about 0.02 molar.

To prevent admixture of electrolytes 22 and 24 and/or transfer of ferric ions therebetween while permitting transfer of charge between the electrolytes, separating means 16 comprises a membrane which is substantially impermeable to cations but highly permeable to chloride ions. Such a membrane may be composed of an anion-exchange resin. One such membrane comprises a polymerized hydrocarbon matrix, e.g. a polystyrene-type matrix, containing fixed tertiary amino and quaternary ammonium groups. The structure and composition of many suitable anion-exchange resins are well-known to the art and hence no further discussion thereof appears necessary herein.

Second electrode 28 is composed of a conductor which is chemically inert in electrolyte 24, e.g. carbon, and is perforated to permit the electrolyte to pass therethrough. Third electrode 30 is composed of material which is inert in electrolyte 22 and is preferably light reflective, e.g. a thin sheet of platinum. Electrode 30 is also perforated to permit electrolyte to flow therethrough. Preferably these perforations are arranged so that, upon assembly of the cell, unperforated portions of electrode 30 oppose perforated portions of electrode 26. Under these conditions light passing through lid 14 and the perforations in silver sheet 60 is reflected by the unperforated portions of electrode 30 onto the underside of sheet 60 thereby achieving more efficient utilization of the light available to recharge the cell.

In assembling the cell, carbon electrode 28 is positioned on shelf 40. Next membrane 16, sandwiched between a pair of insulating spacers 64 and 66 respectively (which are chemically inert in the electrolytes and for example are made of compressible rubber) is positioned atop electrode 28. Then platinum electrode 30 is positioned atop spacer 66 and an insulating spacer 68 is positioned atop this electrode. Terminal screw 36 is then passed through holes appropriately positioned in receptacle 12, spacer 68 and a tab 70 integral with electrode 30, and is secured to the tab and container by nuts 72 and 74. Nut 74 and the portion of screw 36 within receptacle 12 then are coated protectively with a substance, e.g. polystyrene, cemically inert in electrolyte 22. Thereafter silver electrode 26 is positioned atop spacer 68.

Screws 46 and 48 are now removed from ducts 42 and 44 and electrolyte 24 is poured through one of them into lower compartment 20 of the cell until enough electrolyte has been added to contact the lower surface of membrane 16. Then electrolyte 22 is added to the upper compartment 18 of the cell by pouring it carefully onto silver electrode 26. Thereafter a compressible gasket 76 is positioned atop receptacle 12. Screw 56 is then removed from lide 14 to provide an air vent therein and the lide is secured to receptacle 12 by means of screws 78. As shown in the drawing lid 14 comprises a projection 80 dimensioned so as to compress slightly spacers 64, 66 and 68 when lid 14 is secured to receptacle 12 by screws 78. This compressive action serves to hold the electrodes and membrane rigidly in position.

After lid 14 has been secured, screws 46, 48 and 56 are reinserted respectively into ducts 42 and 44 and air vent 54. Then terminal screws 32 and 34 are tapped into electrodes 26 and 28. Finally conductor 38 is connected between terminals 32 and 34.

In the specific cell just described, terminal 32 is the negative terminal and terminal 34 the positive terminal. By connecting a load (not shown) between terminals 32 and 34, electrical energy is withdrawn from the cell. This electrical energy is supplied by the interaction of silver electrode 26 and chloride ions present in electrolyte 22 to form more silver chloride on electrode 26 and supply electrons, via terminal 32 and the load, to terminal 34 and carbon electrode 28, and by the acceptance of these supplied electrons by ferric ions present in electrolyte 24. In the latter process the ferric ions are converted to ferrous ions. The electric circuit is completed within the electrolyte system by chloride ions travelling from electrolyte 24 to electrolyte 22 through anion-permeable membrane 16. In addition, because of the low-impedance connection between terminals 34 and 36, electrons also flow into electrode 30. As a result some of the ferric ions present in electrolyte 22 are also reduced to the ferrous state.

After a considerable amount of electrical energy has been withdrawn from the cell its operation becomes impaired because of the accumulation of silver chloride on electrode 26. In accordance with the invention the cell can be recharged either electrically or by light incident on electrode 26 via translucent lid 14. The specific manner in which recharging occurs in response to each of these forms of energy is now discussed.

To recharge the cell fully, either by radiant energy or by electrical energy, it is necessary that the silver chloride formed on silver electrode 26 during discharge be reconverted to silver and the ferrous ion formed in electrolyte 24 during discharge be reconverted to ferric ion. These conversions may be achieved electrically merely by applying between terminals 34 and 36 a voltage having the same polarity as the cell voltage and a magnitude sufficiently great to cause electrons to be injected into terminal 32 and withdrawn from terminal 34. Under these conditions silver chloride on electrode 26 decomposes into silver which remains on electrode 26 and chloride ions which enter electrolyte 22. Moreover in both electrolytes 22 and 24 ferrous ions are converted to ferric ions. Chloride ions travelling between electrolyte 24 and electrolyte 22 via membrane 16 complete the electric circuit. If desired, conductor 38 may be disconnected from terminals 34 and 36 during electrical recharging.

In accordance with the invention the cell can also be recharged by exposing the silver chloride accumulated on electrode 26 to radiant energy, e.g. to sunlight entering the cell via lid 14 and impinging either directly on the upper surface of electrode 26 or passing through the perforations therein and impinging on and being reflected by platinum electrode 30 onto the lower surface of electrode 26. This recharging process requires that electrodes 28 and 30 be electrically connected in order that the ferrous ions in electrolyte 24 may be converted to ferric ions.

More specifically when the silver chloride deposited on electrode 26 is irradiated, silver is formed on electrode 26, and ferrous ions, produced in electrolyte 22 during discharge, are converted to ferric ions. However because neither ferrous nor ferric ions can pass through membrane 16 neither of these reactions can in itself convert ferrous ions in electrolyte 24 into ferric ions, although such a conversion is required for a full recharging of the battery.

This difficulty is overcome by providing external connection 38 between electrodes 34 and 36. Where such a connection is provided electrons flow from ferrous ions in electrolyte 24 to ferric ions in electrolyte 22 when the ratio of the concentration of ferric ions to the concentration of ferrous ions in electrolyte 22 exceeds the ratio of the concentration of ferric ions to the concentration of ferrous ions in electrolyte 24. This condition arises quite rapidly during radiant energy recharging because of the relatively small total number of iron ions present in electrolyte 22. As a result of this electron flow, ferrous ions in electrolyte 24 are converted to ferric ions and hence are again made available to supply electrical energy to an external load. In addition ferric ions in electrolyte 22 are reconverted to ferrous ions and hence are again made available to participate in the radiant-energy recharging reaction.

From the foregoing it will be appreciated that this conversion of ferrous ions to ferric ions during radiant energy recharging can be accelerated by replacing conductor 38 by an auxiliary source of electrical energy (not shown) having its positive pole connected to terminal 34 and its negative pole connected to terminal 36. Moreover radiant energy recharging may be achieved even while a load (not shown) connected between electrodes 32 and 34 withdraws electrical energy from the cell or the cell is concurrently being electrically recharged by an appropriate source of electric current connected between terminals 32 and 34.

FIGURE 3 illustrates another radiant energy rechargeable cell according to our invention, which differs from the cell of FIGURES 1 and 2 primarily in the nature of the means for maintaining the concentration of ferric chloride in electrolyte 22 at a satisfactorily low level. Specifically whereas this means comprises in the cell of FIGURES 1 and 2 a membrane 16 which is highly permeable to anions and impermeable to cations, i.e. ferrous, ferric and hydrogen ions, this means comprises in the cell of FIGURE 3 a membrane 116 which is highly permeable to the aforementioned cations but substantially impermeable to anions. This means also comprises in the latter cell a material included in electrolyte 24 which selectively reacts with ferric ions, but not with ferrous or hydrogen ions, to form a substance to which membrane 116 is substantially impermeable. In a specific instance membrane 116 may comprise a polystyrene matrix having sulfonic acid groups linked thereto, while the material selectively reactive with ferric ions may comprise phosphate ions. The latter ions combine with ferric ions to form complex anions to which membrane 116 is substantially impermeable. For reasons which will become apparent hereinafter the third electrode 30 of the cell of FIGURES 1 and 2 is not needed in the cell of FIGURE 3 and therefore has been omitted therefrom.

In the cell of FIGURE 3, electrolyte 22 may initially consist essentially of an aqueous solution of ferrous chloride and hydrochloric acid each in a concentration of 0.01 molar, and electrolyte 24 may initially consist essentially of an aqueous solution of phosphoric acid in a concentration of 0.01 molar and ferric chloride in a concentration of 0.001 molar, i.e. containing a substantial excess of phosphate ions. Under these conditions most of the ferric ions in electrolyte 24 combine with the phosphate ions therein to form the aforementioned complex anions. Because membrane 116 is permeable only to cations these complex anions cannot pass through membrane 116. As a result most of the ferric iron is trapped in electrolyte 24 and only part of the relatively small amount of ferric ions remaining uncombined in electrolyte 24 passes through membrane 116 into electrolyte 22. As a result the concentration of ferric ions in electrolyte 22 is maintained at a low value at all times. Nonetheless even those ferric ions combined with phosphate ions are sufficiently active chemically to participate in the supplying of electrical energy to an external load.

In accordance with the invention the cell of FIGURE 3 can be recharged with either electrical or radiant energy, or concurrently by both. The pertinent charging reactions have already been discussed above with regard to FIGURES 1 and 2. However it is a feature of the cell of FIGURE 3 that, as the ferric ion concentration in electrolyte 22 increases by reason of the conversion of the silver chloride by the radiant energy, these ferric ions diffuse across membrane 116 into electrolyte 24. There most of the diffusing ferric ions are complexed with phosphate ions and hence are prevented from returning to electrolyte 22. Accordingly the concentration of ferric ions in electrolyte 22 is maintained at a low value.

FIGURE 4 illustrates another cell according to the invention characterized in that it includes a source of radiant energy comprising a radioactive material. In the specific example here described the respective compositions of the electrodes, selectively-permeable membrane and electrolytes are the same as in the cell of FIGURE 3.

More particularly the cell of FIGURE 4 comprises a casing 120 which includes a cylindrical portion 122 opened at one end and a cap portion 124 tightly fitting over the opened end of cylindrical portion 122. Each of these portions is constructed of a substance, e.g. lead, having a thickness sufficient to absorb substantially completely any radiation emitted by a radioactive substance contained within casing 120.

The cell comprises in addition an electrically insulating, liquid-tight liner 126 disposed within the interior of cylindrical portion 122. Liner 126 may be composed for example of a lead glass the radiation-absorbing properties of which supplement those of lead casing 120. A carbon cylinder 128 having an outer diameter substantially equal to the inner diameter of liner 126 is positioned therewithin and serves as the inert electrode of the cell.

To contain the radioactive substance and to support the radiation-responsive electrode of the cell, there is provided a cylindrical vessel 130 constructed of glass having only a small thickness, e.g. 0.003 inch, a high electrical resistivity, and a relatively low absorption coefficient for beta particles. One such glass has the following composition: silica, 80%; boric oxide, 14%; sodium monoxide, 4%; and alumina, 2%. The radioactive substance, e.g. the radioactive gas krypton 85 which emits beta particles, is inserted within vessel 130 and the open end of vessel 130 is sealed to prevent the radioactive gas from escaping. In addition a substantial portion of the exterior surface of vessel 130 is coated with silver. This silver coating 132 acts as the radiation-responsive electrode of the cell. Vessel 130 is positioned within liner 126 coaxial with the cylindrical surfaces thereof, being supported in this position by electrically insulating rings 134, 136, 138 and 140 which serve also to support a cylindrical membrane 142 which is substantially impermeable to anions and highly permeable to cations. Membrane 142, which may have the same structure as membrane 116 of the cell of FIGURE 3, divides the space enclosed between silver electrode 132 and carbon electrode 128 into two non-communicating compartments 144 and 146. Compartment 144 contains an electrolyte 148 and compartment 146 contains an electrolyte 150. Electrolytes 148 and 150 may have the same respective initial compositions as electrolytes 22 and 24 respectively of the cell of FIGURE 3.

To afford external electrical connections to each of electrodes 128 and 132, threaded rods 152 and 154 respectively are provided. These rods are passed through cap 124 via insulating bushings 156 and 158 respectively and are secured thereto by appropriate washers 160 and nuts 162. Preferably the washers 160 are constructed of lead to reduce to an insignificant level any radiation leakage through the bushings 156 and 158. Rod 152 is connected to carbon electrode 128 by a conductor 164 and rod 154 is connected to silver coating 132 by a conductor 166. Thus rods 152 and 154 function respectively as the positive and negative terminals of the cell.

Upon connection of an external load (not shown) between terminals 152 and 154, an electric current flows out of terminal 152 through the external load and into terminal 154. The cell reactions producing this current have already been discussed with respect to the cell of FIGURE 3 which is chemically the same as the present cell. Concurrently however, and in accordance with the invention, the cell of FIGURE 4 is recharged by radiation emanating from the radioactive material, e.g. krypton 85, contained within vessel 130. More specifically, the beta particles are absorbed by the silver chloride formed during electrical discharge on silver electrode 132 and the cell is recharged by the energy contained therein by a process substantially identical to that involved in the recharging by light of the cell of FIGURE 3. Like that cell, the cell of FIGURE 4 can also be recharged electrically by supplying to its electrodes a current having a direction opposite that of the current supplied by the cell to an external load.

While in the foregoing specific embodiments the radiant energy recharging the cell has been specifically described as either light or beta radiation, it is to be understood that the cell is also rechargeable by other forms of radiant energy having appropriate energy levels. Thus electromagnetic radiations lying in the electromagnetic spectrum between light and gamma rays have a recharging effect upon the cell. In addition corpuscular radiations such as alpha particles or protons can be used to recharge the cell. Moreover the source of radiant energy may be neutrons, supplied for example by an atomic reactor, and hydrogenous material, e.g. paraffin wax. The hydrogenous material absorbs neutrons incident thereon and thereupon emits energetic protons. The latter protons act to recharge the cell upon their impingement on the silver chloride formed on its silver electrode during discharge.

In each of the preceding examples a cell employing a silver electrode and an electrolyte system containing chloride ions, ferric ions and ferrous ions has been described. However the electrodes and the electrolyte system of our novel cell need not necessarily be composed of these specific substances. For example the chloride ions in the electrolyte system may be replaced or supplemented by bromide and/or iodide ions. Where this is done photosensitive compounds corresponding to the halide ions present in the electrolyte adjacent the silver electrode form thereon during discharge. These photosensitive compounds can be reconverted into silver by exposure to radiation thereby to restore the effectiveness of the cell.

In addition the ferrous ion, ferric ion oxidation-reduction system utilized in the foregoing cells may be replaced by any other suitable oxidation-reduction system.

Furthermore numerous cell geometries other than those illustrated in FIGURES 1 to 4 may be utilized to provide for efficient collection of radiant energy onto the radiant-energy responsive electrode of our cell. For example, where the cell is to be used under conditions such that substantial amounts of radiant energy impinge on the cell from points located at the sides thereof as well as above the cell, it may be advantageous to employ radiation-responsive electrodes having a conical or spherical form.

In addition where radioactive material is utilized as the source of radiant energy, it may be introduced into the cell in various ways other than those described above. For example with respect to the embodiment of FIGURE 4, the radioactive krypton source contained within vessel 132 may be omitted and in its stead an electrolyte containing a radioactive substance may be utilized. This substance may be one which is relatively inert with regard to the chemical reactions occurring within the cell or alternatively it may be one which participates in these reactions. As a further alternative, cells in accordance with the invention may be disposed adjacent a port of an atomic reactor so as to be irradiated and thereby recharged by charged particles and electromagnetic radiations generated therewithin.

Moreover although the cell of FIGURE 4 rechargeable by the emanations of radioactive material has been specifically described as one in which the means for maintaining the ferric ion concentration at a low value adjacent the silver electrode comprises a cation-permeable membrane and phosphate ions, cells in which these means comprise an anion-permeable membrane are as readily rechargeable by such emanations. In this regard the cell of FIGURE 4 is readily convertible into a cell of the latter type merely by replacing cation-permeable membrane 142 with an anion-permeable membrane, by positioning an inert electrode between this membrane and silver coating 132 and providing an electrical connection between this inert electrode and carbon electrode 128, and by causing electrolytes 148 and 150 respectively to have the same initial compositions as electrolytes 22 and 24 of the cell of FIGURES 1 and 2.

In each of the cells described above means have been provided for inhibiting parasitic reactions within the cell which tend to reduce the energy-storage capacity thereof. Although in each instance these means have been described as embodied in a radiant-energy rechargeable cell, it is clear that their use is not limited to such cells. On the contrary such means are also useable in cells not rechargeable by radiant energy in which such parasitic reactions are to be inhibited. Moreover these means obviously will inhibit parasitic reactions tending to occur wholly between constituents of an electrolyte as well as parasitic reactions tending to occur between a constituent of an electrolyte and an electrode immersed therein.

While we have described our invention by means of specific examples and in several specific embodiments, we do not wish to be limited thereto for obvious modifications will occur to those skilled in the art without departing from the scope of our invention.

What we claim is:

1. An electric cell rechargeable by radiation having an energy level at least as high as that of light, said cell comprising a container, means permeable to chloride, bromide and iodide ions and substantially impermeable to ferrous, ferric and hydrogen ions, said means dividing said container into two compartments and comprising ferric ions in a maximum concentration of about 0.001 molar, hydrogen ions and ions of at least one halide selected from the class consisting of chloride, bromide and iodide ions, a second aqueous electrolyte contained in the other of said compartments and comprising ferric ions, hydrogen ions and ions of at least one halide selected from said class, an inert electrode and an electrode comprising silver both immersed in said first electrolyte and another inert electrode immersed in said second electrolyte.

2. An electric cell according to claim 1, said cell additionally comprising means for electrically interconnecting said two inert electrodes.

3. An electric cell according to claim 1, wherein said first electrolyte comprises both ferrous ions and ferric ions in respective concentrations such that their sum is between about 0.0001 molar and about 0.001 molar.

4. An electric cell according to claim 1, wherein the volume of said second electrolyte is greater than the volume of said first electrolyte.

5. An electric cell according to claim 1, wherein each of said electrolytes comprises both ferrous ions and ferric ions, the sum of the respective concentrations of said ferrous and ferric ions in said first electrolyte is between about 0.0001 molar and about 0.001 molar and the sum of the respective concentrations of said ferrous and ferric ions in said second electrolyte is greater than 0.001 molar.

6. An electric cell according to claim 5, wherein said volume of said second electrolyte is greater than said volume of said first electrolyte.

7. An electric cell according to claim 1, wherein at least a portion of said container is transmissive of radiant energy capable of decomposing a silver halide comprising said one halide, and said electrodes and dividing means are constructed and arranged so as to cause radiant energy having said capability and entering said cell through said transmissive portion to impinge on said silver-comprising electrode.

8. An electric cell according to claim 1, wherein said silver-comprising electrode comprises a substrate of silver coated with a thin layer of substantially non-porous silver chloride.

9. An electric cell according to claim 1, wherein said means comprise a membrane composed of an anion-exchange resin.

10. An electric cell according to claim 1, wherein said first electrolyte comprises both ferrous ions and ferric ions in respective concentrations such that their sum is between about 0.0001 molar and about 0.001 molar, said second electrolyte comprises both ferrous ions and ferric ions in respective concentrations such that their sum is greater than 0.001 molar, the volume of said first electrolyte is smaller than the volume of said second electrolyte, said one halide in both of said electrolytes is chloride, said silver-comprising electrode comprises a substrate of silver coated with a thin layer of substantially non-porous silver chloride and said means comprise a membrane composed of an anion-exchange resin.

11. An electric cell according to claim 10, wherein at least a portion of said container is transmissive of radiant energy capable of decomposing silver chloride when incident thereon and said electrodes and dividing means are constructed and arranged so as to cause radiant energy having said capability and entering said cell through said transmissive portion to impinge on said electrode comprising silver.

12. An electric cell according to claim 1, said cell additionally comprising a source of radiant energy positioned adjacent said one electrode.

References Cited in the file of this patent
UNITED STATES PATENTS

| | | |
|---|---|---|
| 11,238 | Roberts | Apr. 26, 1892 |
| 870,973 | Little | Nov. 12, 1907 |
| 2,694,742 | Harding | Nov. 16, 1954 |
| 2,700,063 | Manecke | Jan. 18, 1955 |

FOREIGN PATENTS

| | | |
|---|---|---|
| 777,594 | France | Dec. 5, 1934 |

OTHER REFERENCES

Journal of Physical Chemistry, vol. 33, 1929, pages 331–353.